United States Patent
Morioka et al.

(10) Patent No.: US 12,037,906 B2
(45) Date of Patent: Jul. 16, 2024

(54) TUNNEL BORING MACHINE, MEASUREMENT METHOD, AND MEASUREMENT SYSTEM

(71) Applicants: Komatsu Ltd., Tokyo (JP); The University of Tokyo, Tokyo (JP)

(72) Inventors: Eiichi Morioka, Tokyo (JP); Shinichi Terada, Tokyo (JP); Rui Fukui, Tokyo (JP); Yudai Yamada, Tokyo (JP)

(73) Assignees: Komatsu Ltd., Tokyo (JP); The University of Tokyo, Tokyo (JP)

(*) Notice: Subject to any disclaimer, the term of this patent is extended or adjusted under 35 U.S.C. 154(b) by 267 days.

(21) Appl. No.: 17/606,821

(22) PCT Filed: May 22, 2020

(86) PCT No.: PCT/JP2020/020376
§ 371 (c)(1),
(2) Date: Oct. 27, 2021

(87) PCT Pub. No.: WO2020/241514
PCT Pub. Date: Dec. 3, 2020

(65) Prior Publication Data
US 2022/0220849 A1      Jul. 14, 2022

(30) Foreign Application Priority Data
May 31, 2019   (JP) .................. 2019-102082

(51) Int. Cl.
*E21D 9/00*    (2006.01)
*E21D 9/11*    (2006.01)
*G01M 5/00*    (2006.01)

(52) U.S. Cl.
CPC .............. *E21D 9/003* (2013.01); *E21D 9/112* (2013.01); *G01M 5/0033* (2013.01)

(58) Field of Classification Search
CPC ...... E21D 9/003; E21D 9/112; G01M 5/0033; E21B 12/02; E21B 10/12
See application file for complete search history.

(56) References Cited

U.S. PATENT DOCUMENTS

| | | |
|---|---|---|
| 5,106,163 A | 4/1992 | Fujiwara et al. |
| 5,438,860 A | 8/1995 | Kawai et al. |
| 8,172,334 B2 * | 5/2012 | Lindbergh ............... E21D 9/003 299/1.8 |
| 10,808,532 B2 | 10/2020 | Kawai et al. |

(Continued)

FOREIGN PATENT DOCUMENTS

| | | |
|---|---|---|
| JP | H04-110642 A | 4/1992 |
| JP | H09-041863 A | 2/1997 |
| JP | 2003-082986 A | 3/2003 |

(Continued)

OTHER PUBLICATIONS

Supplementary European Search Report dated Nov. 8, 2022, issued in the corresponding EP patent application No. 20814185.3.

*Primary Examiner* — Carib A Oquendo
(74) *Attorney, Agent, or Firm* — Locke Lord LLP

(57) ABSTRACT

A tunnel boring machine includes: a disc cutter including a cutter ring; and a member for use in measurement of a wear amount of the cutter ring with a three-dimensional shape measurement device, in which the member is provided at a part constant in relative position to the cutter ring.

13 Claims, 18 Drawing Sheets

(56) References Cited

U.S. PATENT DOCUMENTS

2017/0122105 A1\* 5/2017 Lenaburg .................. E21D 9/11
2019/0112924 A1\* 4/2019 Kawai ..................... E21D 9/003

FOREIGN PATENT DOCUMENTS

| | | |
|---|---|---|
| JP | 2005-207090 A | 8/2005 |
| JP | 2015-124466 A | 7/2015 |
| JP | 2017-206848 A | 11/2017 |
| KR | 2018-0129464 A | 12/2018 |
| WO | 03/087537 A1 | 10/2003 |

\* cited by examiner

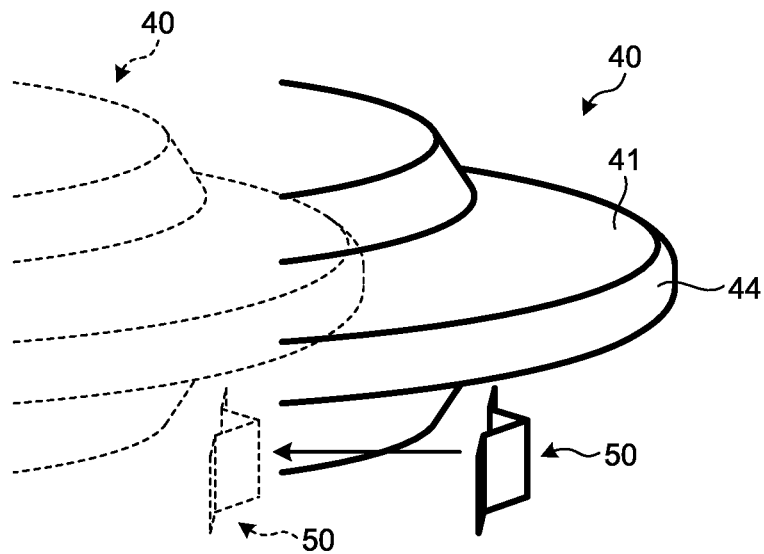
FIG. 17 (a)
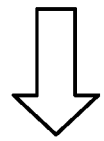
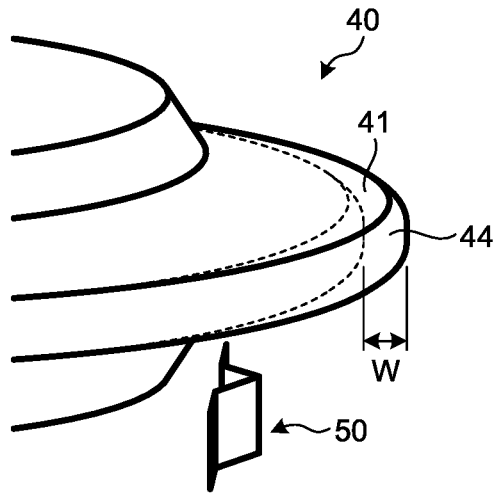
FIG. 17 (b)

TUNNEL BORING MACHINE, MEASUREMENT METHOD, AND MEASUREMENT SYSTEM

FIELD

The present invention relates to a tunnel boring machine, a measurement method, and a measurement system.

BACKGROUND

Regarding a tunnel boring machine, the wear amount of a disc cutter mounted on a cutterhead is measured regularly. Known has been a technique of showing the condition of the leading end portion of a tunnel boring machine on an image display device by use of an image sensor (for example, refer to Patent Literature 1). As a technique of measuring the shape of an object in a noncontact manner, known has been a three-dimensional shape measurement device.

CITATION LIST

Patent Literature

Patent Literature 1: JP H04-110642 A

SUMMARY

Technical Problem

In a case where the wear amount of a disc cutter is measured with a three-dimensional shape measurement device, for example, three-dimensional data of the disc cutter in the criterial state, such as just after attachment or before operation, and three-dimensional data of the disc cutter in an operation state are superimposed together on the basis of features of the shape of the disc cutter, and then the wear amount is measured. However, a change in the shape of the disc cutter due to wearing is likely to cause a larger error in superimposition of such pieces of three-dimensional data.

An object of the present invention is to achieve highly accurate measurement of the wear amount of a disc cutter.

Solution to Problem

According to an aspect of the present invention, a tunnel boring machine comprises: a disc cutter including a cutter ring; and a member for use in measurement of a wear amount of the cutter ring with a three-dimensional shape measurement device, wherein the member is provided at a part constant in relative position to the cutter ring.

Advantageous Effects of Invention

According to the present invention, highly accurate measurement of the wear amount of a disc cutter can be achieved.

BRIEF DESCRIPTION OF DRAWINGS

FIG. 17(a) and (b) are schematic explanatory views of alignment in measurement.

DESCRIPTION OF EMBODIMENTS

Embodiments of the present invention will be described below with reference to the accompanying drawings. However, the present invention is not limited to the embodiments. The constituent elements in the following embodiments can be appropriately combined. In some cases, some of the constituent elements are not necessarily used.

Tunnel Boring Machine

Figure 1:
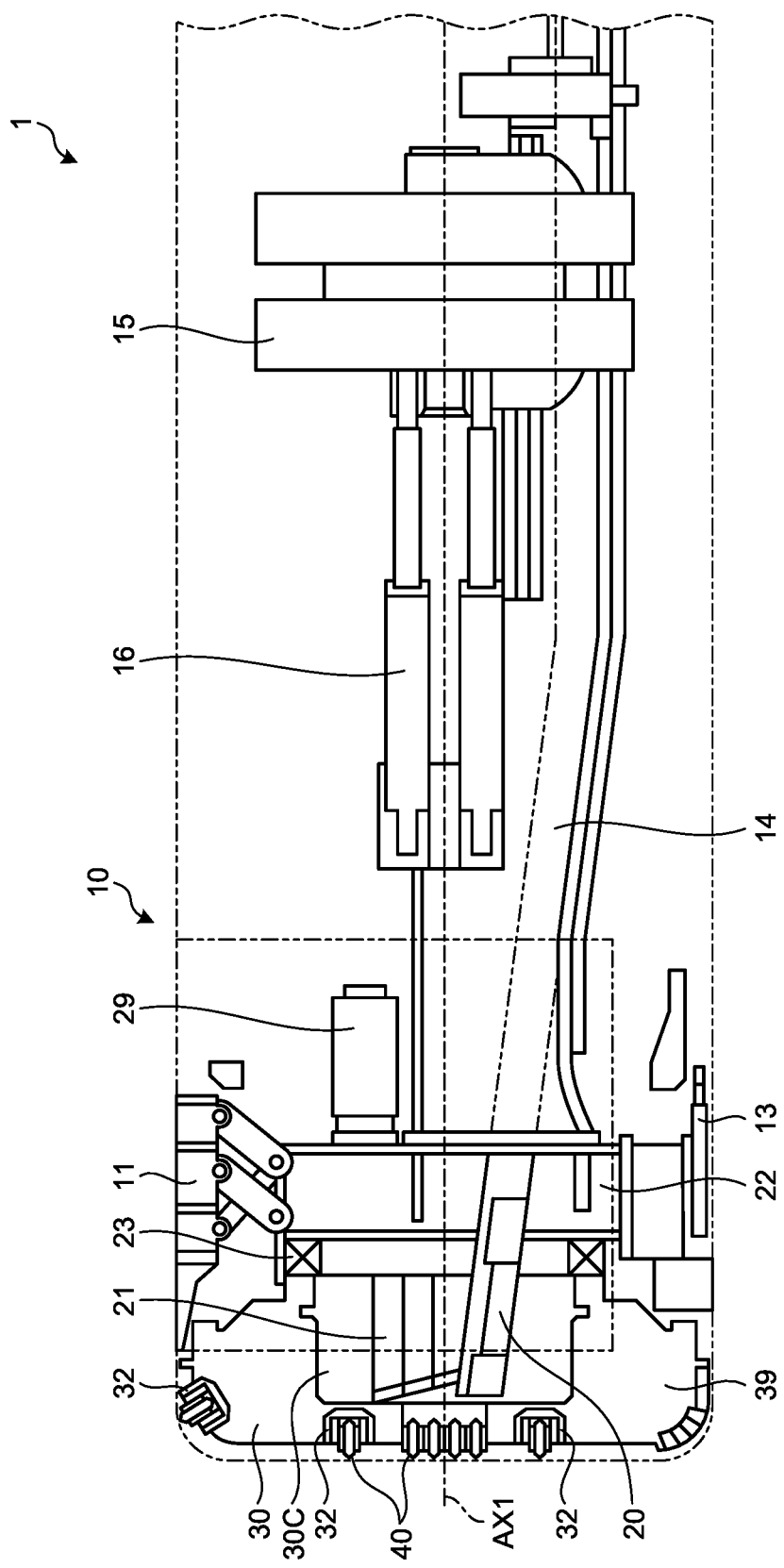
FIG. 1 is a side view of the configuration of a tunnel boring machine according to the present embodiment.
Figure 2:
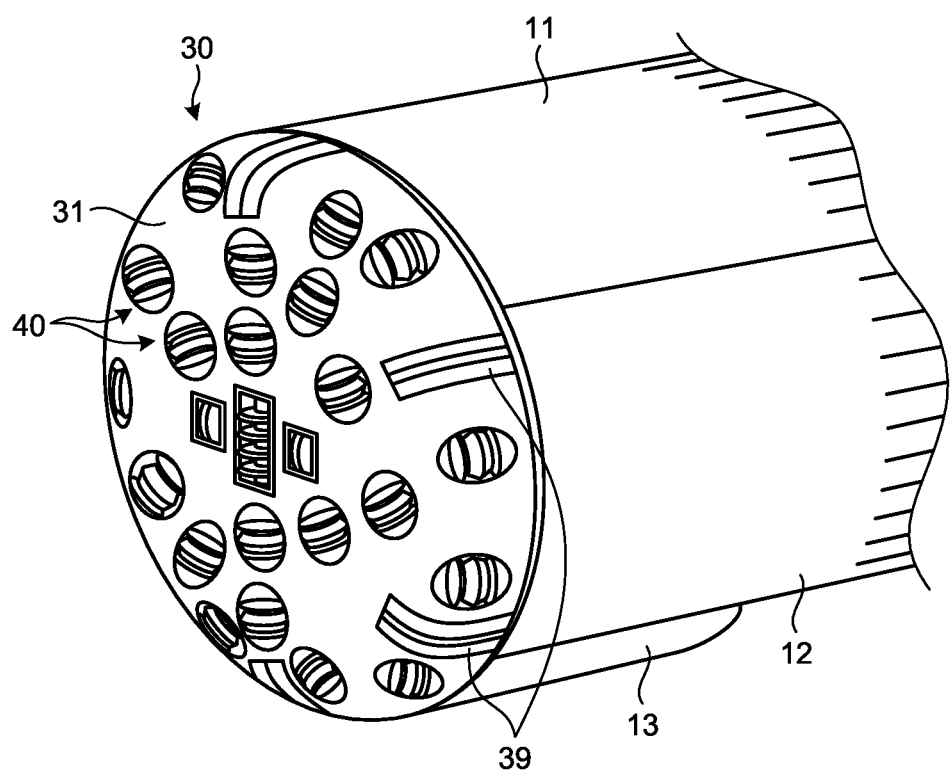
FIG. 2 is a schematic perspective view of a cutterhead of the tunnel boring machine according to the present embodiment.

FIG. 1 is a side view of the configuration of a tunnel boring machine 1 according to the present embodiment. FIG. 2 is a schematic perspective view of a cutterhead 30 of the tunnel boring machine 1 according to the present embodiment. For example, the tunnel boring machine 1 excavates rock in construction of an underground structure, such as a tunnel or a system for supplying water. The tunnel boring machine 1 includes a main body 10 and the cutterhead 30 that is provided on the front side of the main body 10 and excavates rock. As illustrated in FIGS. 1 and 2, the cutterhead 30 is domed in shape and internally has a cutter chamber 30C serving as a space for taking in excavated muck generated due to excavation.

The main body 10 includes a main beam 14 extending in the front-and-back direction and a cutterhead support 22 provided at the front end of the main beam 14. The cutterhead 30 is coupled rotatably to the cutterhead support 22 through a bearing 23. The cutterhead support 22 of the main body 10 has an upper portion provided with a roof support 11, side portions each provided with a side support 12, and a lower portion provided with a vertical support 13. As illustrated in FIG. 2, the roof support 11, the side supports 12, and the vertical support 13 are provided in a cylindrical shape such that the respective outer circumferences thereof are along the sectional shape for excavation.

Inside the main body 10, provided are a gripper 15 to be pressed against the wall of a tunnel and a thrust jack 16 variable in length along the main beam 14. The end portion on the front side in the axial direction of the thrust jack 16 is attached on the front side of the main beam 14 and the end portion on the back side thereof is attached to the gripper 15. The thrust jack 16 is provided variably in length in the front-and-back direction. The tunnel boring machine 1 generates a thrust force with a variation in the length of the thrust jack 16. The tunnel boring machine 1 presses the gripper 15 against the wall of the tunnel, to acquire a thrust reaction force.

Inside the main body 10, provided are a belt conveyor 20 extending in the front-and-back direction, a chute hopper 21 provided at the upper portion on the front side of the belt conveyor 20, the cutterhead support 22 provided at the end portion on the front side of the main beam 14, and a drive motor 29. The belt conveyor 20 conveys excavated muck generated due to excavation, backward. The belt conveyor 20 is provided inside the main beam 14 tubular in shape and penetrates through the cutterhead support 22 such that the leading end thereof is located in the cutter chamber 30C. The chute hopper 21 is open in the cutter chamber 30C and guides, to the belt conveyor 20, excavated muck scooped in by buckets 39 of the cutterhead 30. The cutterhead support 22 supports the cutterhead 30 rotatably around the rotation axis AX1 thereof. The cutterhead support 22 is provided with the drive motor 29 for rotating the cutterhead 30. The drive motor 29 serves as a hydraulic motor or an electric motor.

The cutterhead support 22 to which the cutterhead 30 is connected through the bearing 23 is provided with the drive motor 29. The cutterhead 30 rotates around the rotation axis AX1 due to the drive motor 29. Due to a variation in the length of the thrust jack 16, the cutterhead 30 moves in the front-and-back direction with respect to the gripper 15. The cutterhead 30 has a plurality of disc cutters 40 mounted thereon. The cutterhead 30 is provided ahead of the main body 10. The cutterhead 30 is provided with a plurality of cylindrical cases 32 each housing and retaining a disc cutter 40. That is, the cases 32 provided at the cutterhead 30 are identical in position to the disc cutters 40 provided at the cutterhead 30.

Disc Cutter

Figure 3:
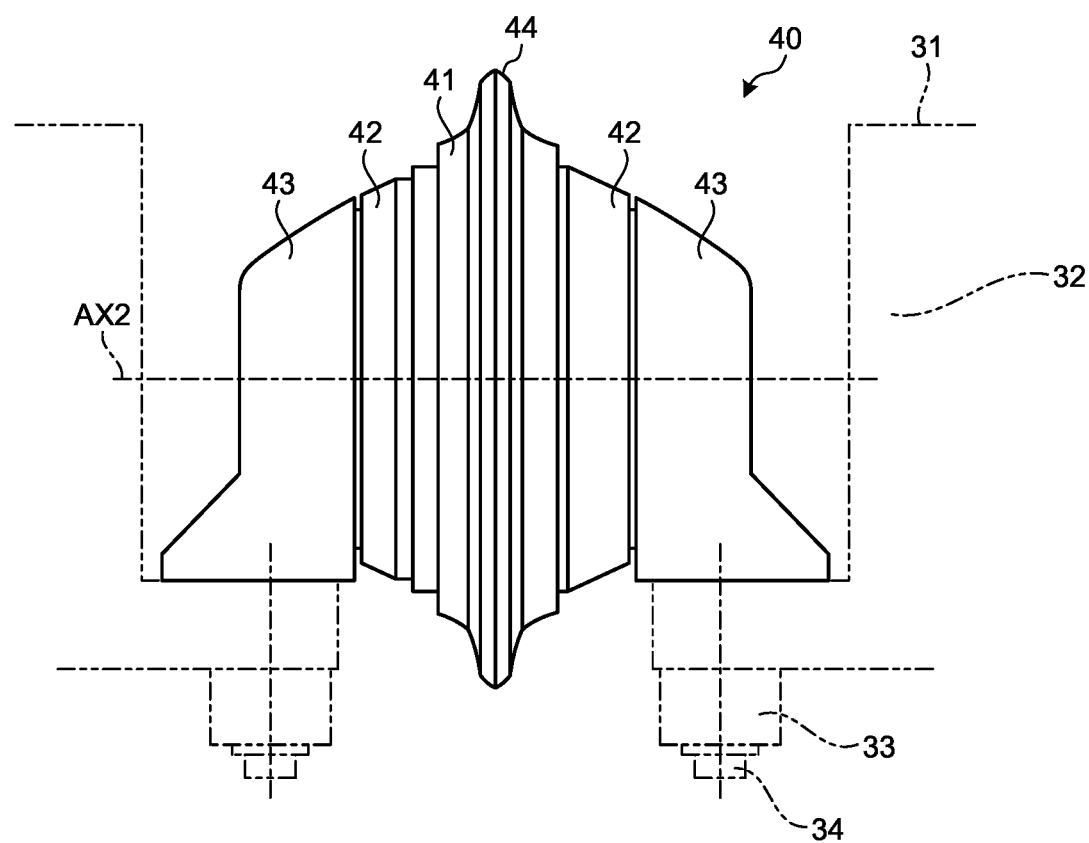
FIG. 3 is a side view of a disc cutter mounted on a case.
Figure 4:
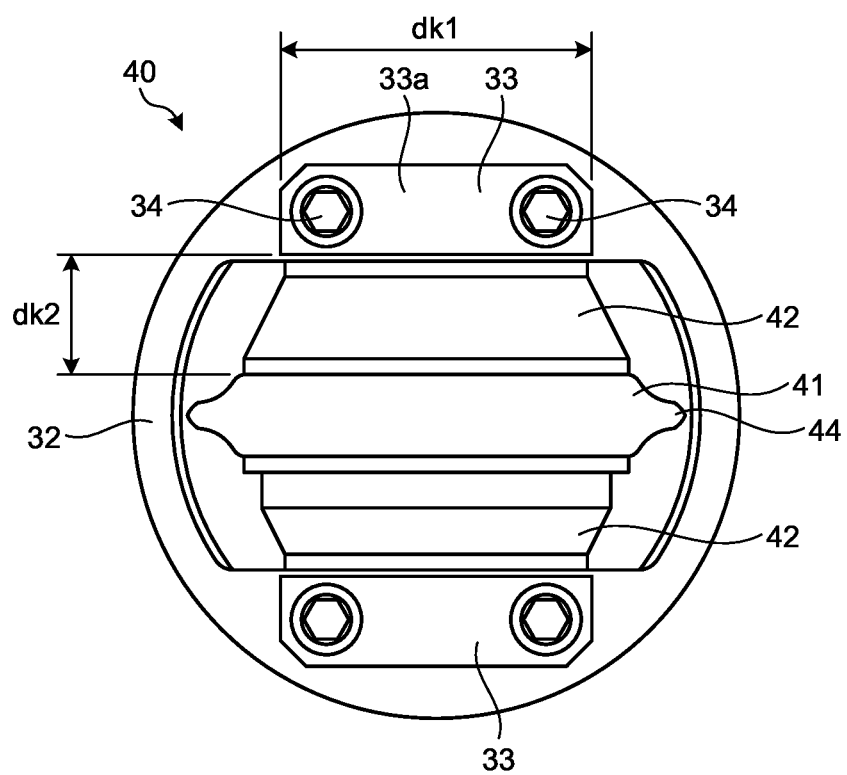
FIG. 4 is a front view of the disc cutter mounted on the case.

A disc cutter 40 will be described with FIGS. 3 and 4. FIG. 3 is a side view of the disc cutter 40. FIG. 4 is the front view of the disc cutter 40. The disc cutter 40 is supported rotatably to the cutterhead 30. The disc cutter 40 is provided at the cutterhead 30 such that the rotation axis thereof (fixed axis AX2 to be described below) intersects with the rotation axis AX1 of the cutterhead 30. The disc cutter 40 rotates as the disc cutter 40 is pressed against the excavation face of the tunnel, so that the rock is crushed. More particularly, with the cutterhead 30 rotating, application of a forward thrust force to the main body 10 and the cutterhead 30 causes the disc cutter 40 to rotate in contact with the rock under pressure. Rotation of the disc cutter 40 in contact with the rock under pressure causes rock crushing and rock cracking at the contact between a blade edge 44 of the disc cutter 40 and the rock. A crack occurring in the rock links with another crack adjacent thereto and then adjacent crushing occurs, resulting in excavation of the rock. Excavated muck generated in excavation of the rock is scooped in the chute hopper 21 open in the cutter chamber 30C through the buckets 39 provided at the cutterhead 30 and then is conveyed backward by a belt conveyor 17.

The disc cutter 40 includes a cutter ring 41, a hub 42 supporting the cutter ring 41 unrotatably, a shaft (not illustrated) supporting the hub 42 rotatably through a bearing (not illustrated), and a pair of retainers 43 retaining the shaft with the hub 42 interposed therebetween in the axial direction. The central line of the shaft retained by the pair of retainers 43 is illustrated as the fixed axis AX2 in FIG. 3. That is, the cutter ring 41 and the hub 42 are supported rotatably through the bearing not illustrated on the fixed axis AX2. The cutter ring 41 and the hub 42 are rotatable integrally. The pair of retainers 43 serves as a retaining member that sandwiches the cutter ring in the axial direction and retains the cutter ring rotatably. The cutter ring 41 rotates as the cutter ring 41 is pressed against the excavation face of the tunnel, so that the excavation face is excavated.

The cutter ring 41 has a blade edge 44. The blade edge 44 protrudes forward and backward from the case 32 (refer to FIGS. 3 and 11). The blade edge 44 is exposed from the front face and back face of the case 32. The blade edge 44 protrudes forward from the front face 31 of the cutterhead 30.

As illustrated in FIGS. 3 and 4, the disc cutter 40 is detachably housed in the case 32 provided at the cutterhead 30. Inside the case 32, provided is a bearing face that receives the press reaction force of the cutter ring 41 to the excavation face. The pair of retainers 43 of the disc cutter 40 is fixed to the bearing face. Key blocks 33 are used for positioning of the disc cutter 40 to the case 32, namely, for positioning of the disc cutter 40 to the cutterhead 30. The key blocks 33 are each detachably provided, from the cutter chamber side, to the case 32. As illustrated in FIG. 3, with the disc cutter 40 having the retainers 43 abutting on the bearing face of the case 32, the key blocks 33 are provided from the cutter chamber side. Each key block 33 and the corresponding retainer 43 are fastened through the case 32 with bolts 34, so that the disc cutter 40 is fixed to the cutterhead 30. As described above, the bearing face of the case 32 functions to support the press reaction force of the disc cutter 40 to the excavation face, and the key blocks 33 in cooperation with the bolts 34 function as a positioning member that positions the disc cutter 40 to the cutterhead 30 and restricts movement thereof.

Method of Replacing Disc Cutter

Figure 5:
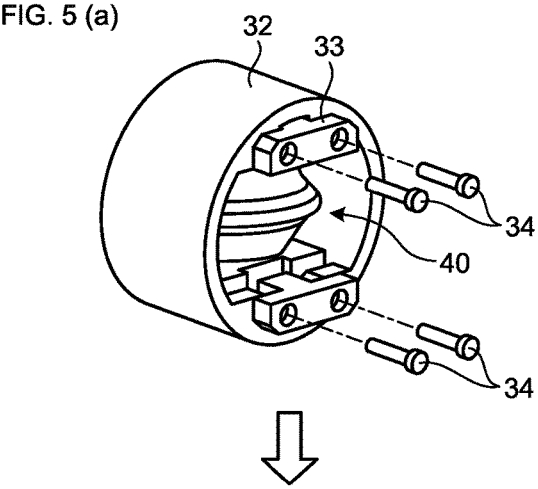
FIG. 5(a)-(d) are schematic explanatory views of detachment of the disc cutter.
Figure 5:
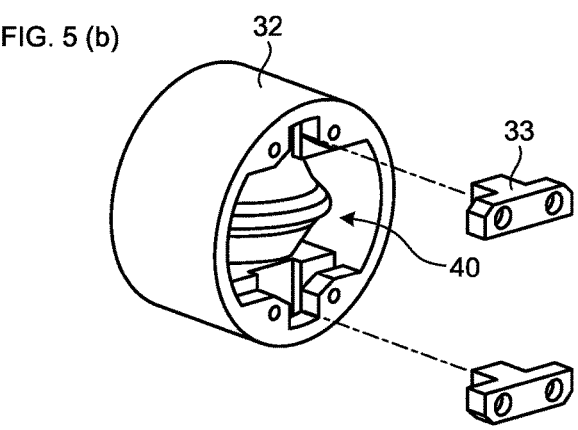
Figure 5:
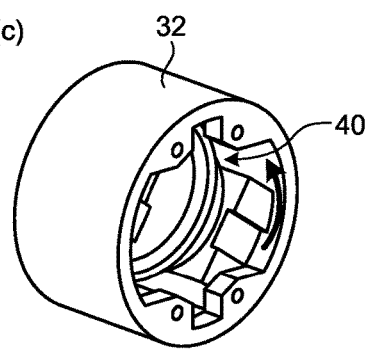
Figure 5:
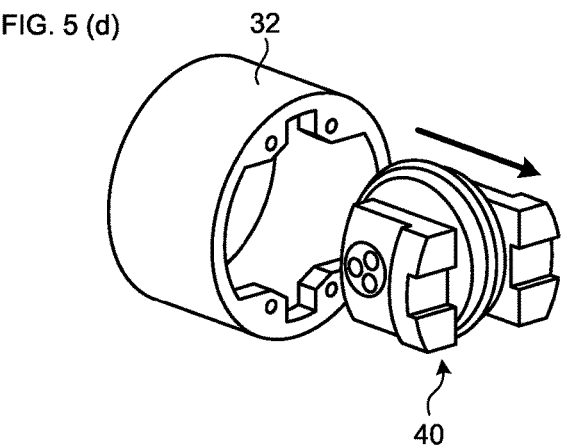

A method of replacing a disc cutter 40 will be described in detail with FIG. 5(a)-(d). FIG. 5(a)-(d) are schematic explanatory views of detachment of the disc cutter 40. The disc cutter 40 is restricted by the key blocks 33 in detachment from the case 32 and in movement along the circumferential direction of the case 32. As illustrated in FIG. 5(*a*), the bolts 34 fixing the key blocks 33 to the case 32 are detached. As illustrated in FIG. 5(*b*), the key blocks 33 are detached from the case 32. The detachment of the key blocks 33 releases the restriction of the disc cutter 40. As illustrated in FIG. 5(*c*), the disc cutter 40 housed in the case 32 is rotated by 90° in the circumferential direction of the case 32. As illustrated in FIG. 5(*d*), the disc cutter 40 is detached from the case 32.

In a case where a new disc cutter 40 is housed into the case 32, the disc cutter 40 is inserted into the case 32, inversely to the process in FIG. 5(*d*). Inversely to the process in FIG. 5(*c*), the disc cutter 40 inserted in the case 32 is rotated by 90°, inversely to the rotation in detachment, in the circumferential direction of the case 32. Inversely to the process in FIG. 5(*b*), the key blocks 33 are attached to the case 32. Inversely to the process in FIG. 5(*a*), the key blocks 33 are fixed to the case 32 with the bolts 34. In this manner, fixed is the disc cutter 40 restricted by the key blocks 33 in detachment from the case 32 and in movement along the circumferential direction of the case 32.

Excavation Method by Tunnel Boring Machine

An excavation method by such a tunnel boring machine 1 as above will be described. In the tunnel boring machine 1, due to the drive motor 29, the cutterhead 30 rotates with respect to the main body 10. Each disc cutter 40 attached to the cutterhead 30 rotates as each disc cutter 40 is pressed against the excavation face of the tunnel, so that the rock is crushed. Excavated muck produced in excavation of the rock is scooped into the main body 10 by the buckets 39 and then is conveyed backward by the belt conveyor 17. Because each disc cutter 40 wears due to excavation, for example, before the start of daily work or every predetermined period, the wear amount of the cutter ring 41 of each disc cutter 40 is measured.

Measurement Device

Figure 6:
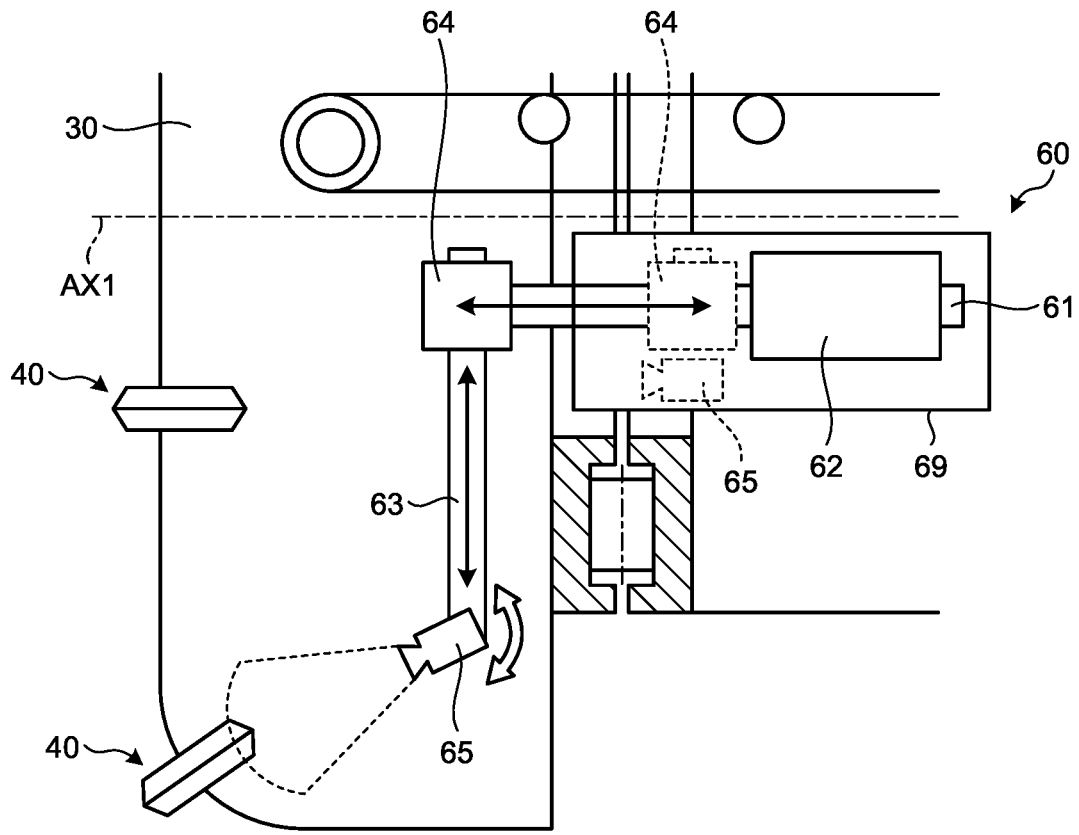
FIG. 6 is a schematic view of the configuration of a measurement device.
Figure 7:
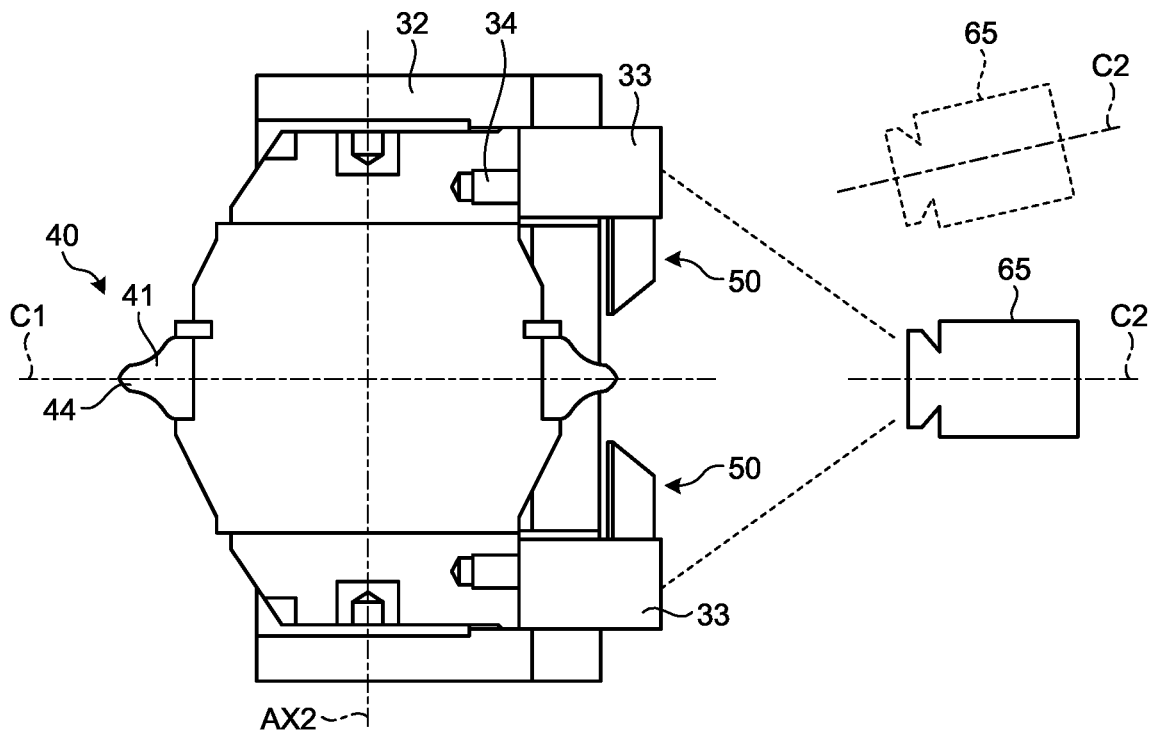
FIG. 7 is a schematic explanatory view of a state where the measurement device measures a disc cutter.

A measurement device 60 for use in measurement of the wear amount of the cutter ring 41 of a disc cutter 40, in the tunnel boring machine 1, will be described with FIGS. 6 and 7. FIG. 6 is a schematic view of the configuration of the measurement device 60. FIG. 7 is a schematic explanatory view of a state where the measurement device 60 measures a disc cutter 40. The measurement device 60 is provided closer to the cutter chamber 30C (refer to FIG. 1) in the tunnel boring machine 1. The measurement device 60 includes a forward-and-backward variable slider 61 variable forward and backward in length, a front-and-back movement actuator 62 that slides a scanner 65 along the forward-and-backward variable slider 61, an upward-and-downward variable slider 63 variable upward and downward in length, an up-and-down movement actuator 64 that slides the scanner 65 along the upward-and-downward variable slider 63, the scanner 65, and a case 69 that houses the forward-and-backward variable slider 61, the front-and-back movement actuator 62, the upward-and-downward variable slider 63, the up-and-down movement actuator 64, and the scanner 65. The front-and-back movement actuator 62 varies the forward-and-backward variable slider 61 in length, to slide the scanner 65 forward and backward. The up-and-down movement actuator 64 varies the upward-and-downward variable slider 63 in length, to slide the scanner 65 upward and downward.

The scanner 65 serves as a 3D scanner, detects a target, and outputs three-dimensional data indicating the three-dimensional shape of the target to a data acquisition unit 115 in a measurement controller 110. More particularly, the scanner 65 is capable of detecting the three-dimensional shape of the cutter ring 41 of a disc cutter 40 and a member 50 to be described below (refer to FIG. 10). For example, the scanner 65 detects criterial three-dimensional data indicating the three-dimensional shape of a cutter ring 41 and a member 50 in the criterial state, such as just after attachment or before operation of a disc cutter 40 on which a new cutter ring 41 is mounted (namely, the cutter ring 41 has not worn yet) and measurement three-dimensional data indicating the three-dimensional shape of the cutter ring 41 and the member 50 in an operation state (namely, the cutter ring 41 is assumed to have worn to a certain extent). The scanner 65 outputs the detected criterial three-dimensional data and measurement three-dimensional data to the data acquisition unit 115 in the measurement controller 110.

The scanner 65 is movable forward and backward by the forward-and-backward variable slider 61 and the front-and-back movement actuator 62 and is movable in the up-and-down direction by the upward-and-downward variable slider 63 and the up-and-down movement actuator 64.

The scanner 65 adjustable in tilt angle is provided at the upward-and-downward variable slider 63. The scanner 65 is capable of adjusting the angle of measurement to the cutter ring 41 of a disc cutter 40. The angle of measurement corresponds to the angle between the central line C1 of the blade edge 44 of the cutter ring 41 and the central line C2 of the optical axis of the scanner 65.

For example, the case 69 is provided at the cutterhead support 22. With the measurement device 60 in non-measurement, the forward-and-backward variable slider 61, the front-and-back movement actuator 62, the upward-and-downward variable slider 63, the up-and-down movement actuator 64, and the scanner 65 are housed in the case 69. In response to measurement of the measurement device 60, the forward-and-backward variable slider 61, the front-and-back movement actuator 62, the upward-and-downward variable slider 63, the up-and-down movement actuator 64, and the scanner 65 are developed from the case 69.

Control System for Tunnel Boring Machine

Figure 8:
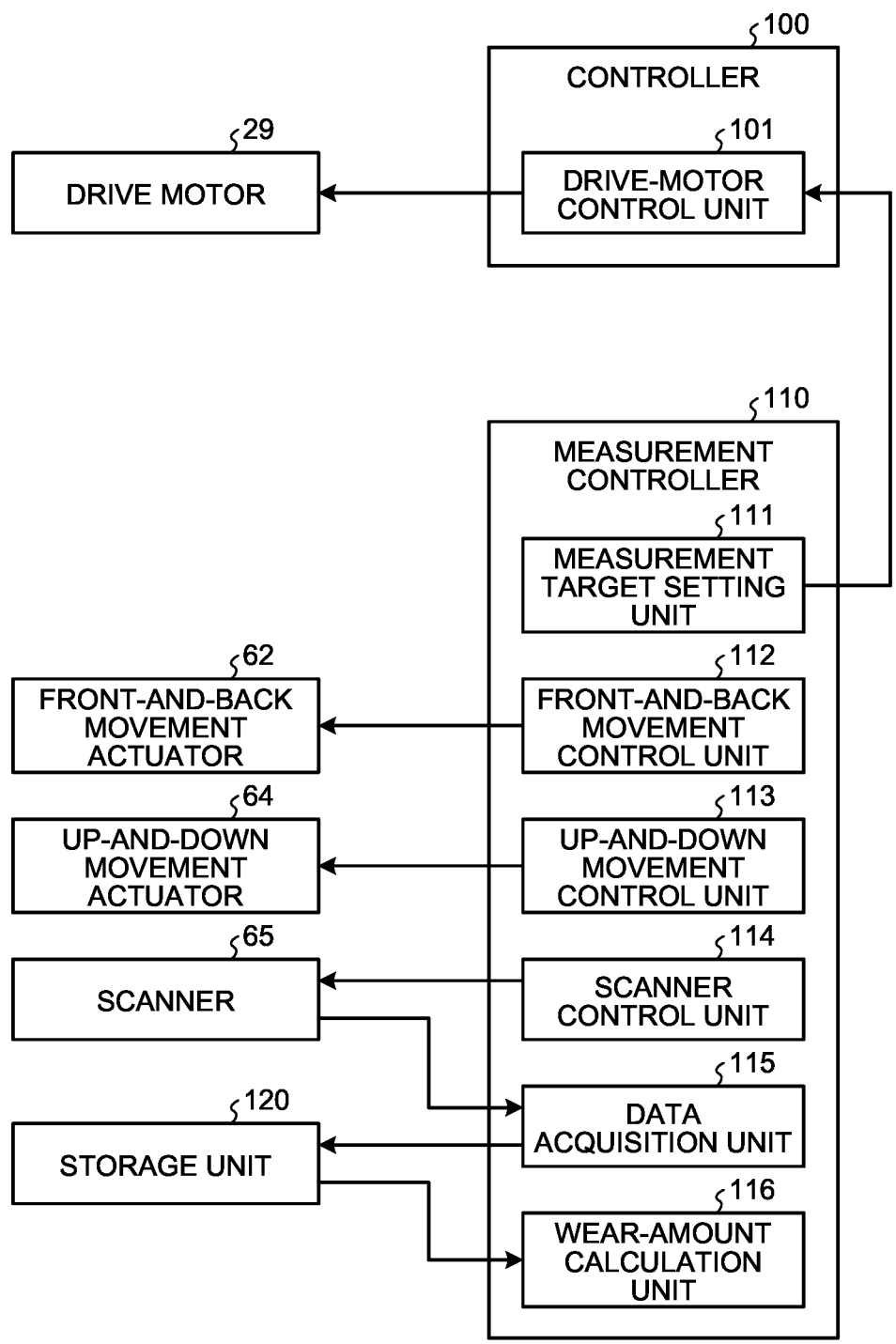
FIG. 8 is a block diagram of the configuration of a controller.

A controller 100 will be described with FIG. 8. FIG. 8 is a block diagram of the configuration of the controller 100. For example, the tunnel boring machine 1 is controlled by the controller 100. For example, on the basis of operation information input through an operation board not illustrated or operating information input through an excavation management system not illustrated, the controller 100 actuates the tunnel boring machine 1. A drive-motor control unit 101 in the controller 100 controls the drive motor 29 to rotate or stop rotating.

Control System for Measurement Device

As illustrated in FIG. 8, for example, the front-and-back movement actuator 62, the up-and-down movement actuator 64, and the scanner 65 in the measurement device 60 are controlled by the measurement controller 110. A measurement target setting unit 111 in the measurement controller 110 controls the drive motor 29 to rotate the cutterhead 30 such that the scanner 65 can measure a disc cutter 40 as the measurement target. A front-and-back movement control unit 112 in the measurement controller 110 controls the front-and-back movement actuator 62 to adjust the position in the front-and-back direction of the scanner 65 on the basis of the disc cutter 40 as the measurement target. An up-and-down movement control unit 113 in the measurement controller 110 controls the up-and-down movement actuator 64 to adjust the position in the up-and-down direction of the scanner 65 on the basis of the disc cutter 40 as the measurement target. A scanner control unit 114 in the measurement controller 110 controls the scanner 65 to perform three-dimensional measurement. The data acquisition unit 115 in the measurement controller 110 acquires three-dimensional data from the scanner 65. A wear-amount calculation unit 116 in the measurement controller 110 calculates the wear amount of the cutter ring 41 of the disc cutter 40, on the basis of the acquired three-dimensional data.

Computer System

Figure 9:
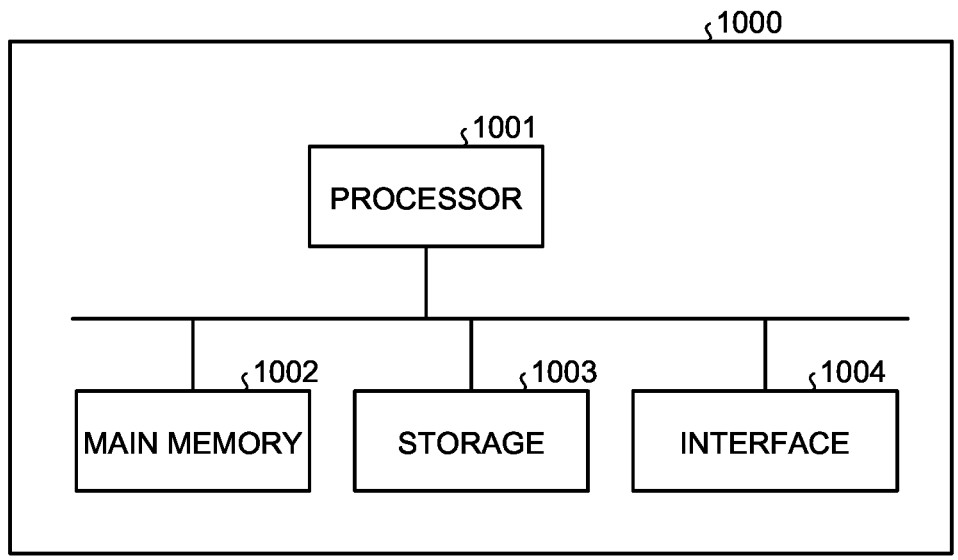
FIG. 9 is a block diagram of a computer system according to the present embodiment.

A computer system 1000 will be described with FIG. 9. FIG. 9 is a block diagram of the computer system 1000 according to the present embodiment. The controller 100 described above includes the computer system 1000. The computer system 1000 includes a processor 1001 like a central processing unit (CPU), a main memory 1002 including a nonvolatile memory like a read only memory (ROM) and a volatile memory like a random access memory (RAM), a storage 1003, and an interface 1004 including an input/output circuit. The function of the controller 100 and the function of the measurement controller 110, described above, are stored as a program in the storage 1003. The processor 1001 reads the program from the storage 1003, develops the program in the main memory 1002, and performs the processing described above, in accordance with the program. Note that the program may be distributed to the computer system 1000 through a network.

Additional Member According to First Embodiment

Figure 10:
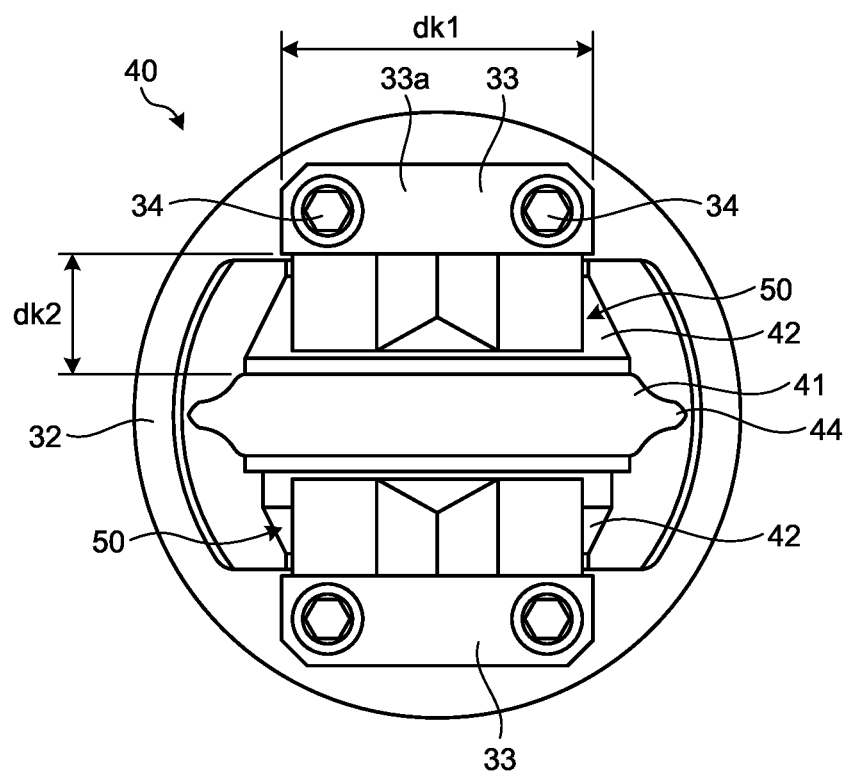
FIG. 10 is a front view of members each provided at a key block by welding, in a first embodiment of the present invention.
Figure 11:
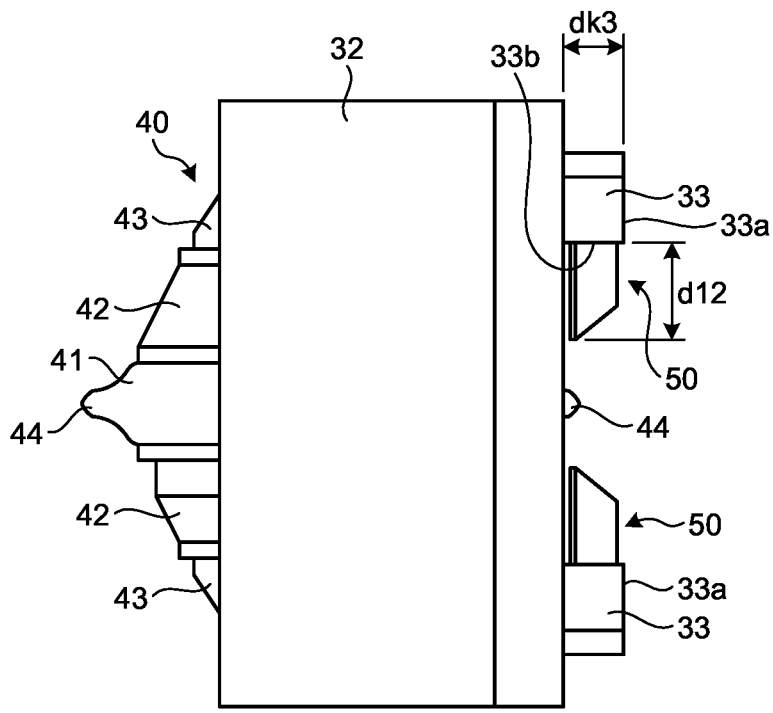
FIG. 11 is a side view of a case on which a disc cutter is mounted with the key blocks each provided with the member, in the first embodiment of the present invention.

A member 50 will be described with FIGS. 10 and 11. FIG. 10 is a front view of members 50 each provided at a key block by welding, in a first embodiment of the present invention. FIG. 11 is a side view of a case 32 on which a disc cutter 40 is mounted with the key blocks 33 each provided with the member 50, in the first embodiment of the present invention. The members 50 are used in measurement of the wear amount of the cutter ring 41 of the disc cutter 40 with the three-dimensional shape measurement device (hereinafter, referred to as the "measurement device") 60. More particularly, the members 50 are used in alignment in measurement with the measurement device 60. The members 50 together with the cutter ring 41 are located detectably in the detection area of the measurement device 60. Thus, in measurement with the measurement device 60, the members 50 are detected together with the cutter ring 41.

The members 50 are each located so as to be less likely to wear in excavation of the tunnel boring machine 1 and so as not to interfere with excavation and replacement of the disc cutter 40. The members 50 are each provided at a part constant in relative position to the cutter ring 41 of the disc cutter 40. The constant relative position means that the positional relationship between the cutter ring 41 and each member 50 does not vary between a state just after attachment or before operation of the disc cutter 40 and the state of the disc cutter 40 in operation. The members 50 are provided near the cutter ring 41. In the present embodiment, the members 50 are provided at the key blocks 33 that restrict movement of the disc cutter 40 along the circumferential direction of the case 32.

The members 50 are provided closer to the cutter chamber 30C in the tunnel boring machine 1.

Figure 12:
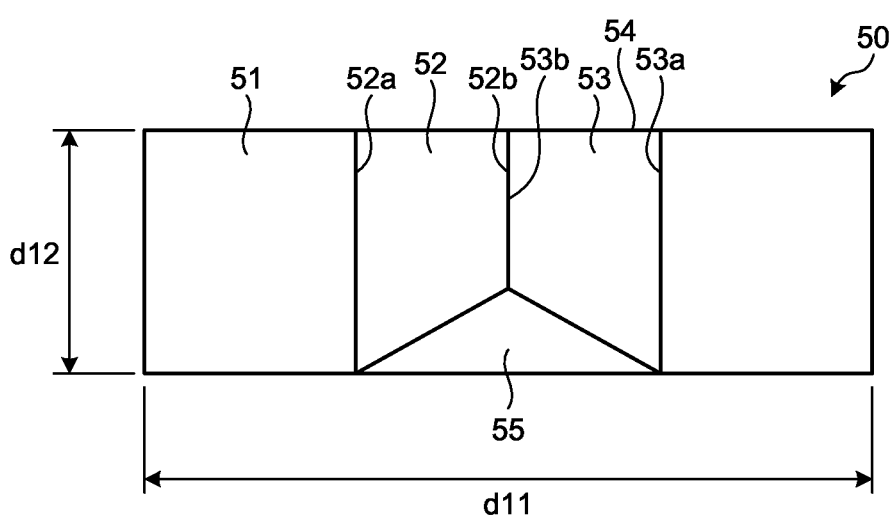
FIG. 12 is a front view of an exemplary member.
Figure 13:
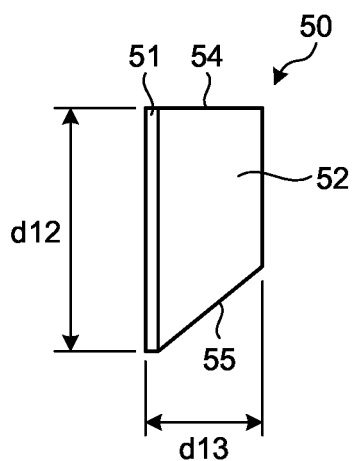
FIG. 13 is a side view of the member illustrated in FIG. 12.
Figure 14:
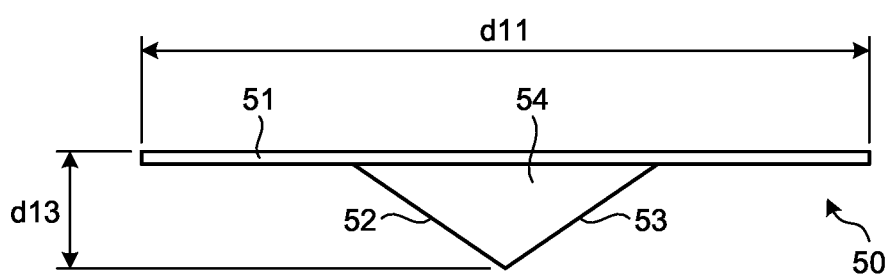
FIG. 14 is a plan view of the member illustrated in FIG. 12.

An exemplary shape of member 50 will be described with FIGS. 12 to 14. FIG. 12 is a front view of an exemplary member 50. FIG. 13 is a side view of the member 50 illustrated in FIG. 12. FIG. 14 is a plan view of the member 50 illustrated in FIG. 12. The member 50 is formed of a combination of a wall 51, a wall 52, a wall 53, a wall 54, and a wall 55 planar in shape. The wall 51 is rectangular in shape. The wall 51 is provided in parallel to a surface 33a of a key block 33. The wall 52 and the wall 53 are each trapezoidal in shape. The wall 52 and the wall 53 are each provided inclining at an intermediate portion of the wall 51. The wall 52 and the wall 53 are each provided in a plane crossing the surface 33a of the key block 33. A circumferential edge 52a of the wall 52 and a circumferential edge 53a of the wall 53 are each joined to the intermediate portion of the wall 51, resulting in formation of bends. A circumferential edge 52b of the wall 52 and a circumferential edge 53b of the wall 53 are joined together, resulting in formation of a bend. The wall 54 and the wall 55 are each triangular in shape. The wall 54 is provided covering the opening surrounded by the upper portion of the wall 51, the upper portion of the wall 52, and the upper portion of the wall 53. The wall 55 is provided covering the opening surrounded by the lower portion of the wall 51, the lower portion of the wall 52, and the lower portion of the wall 53. The wall 52, the wall 53, the wall 54, and the wall 55 each serve as part of formation of a humped shape protruding inward in the radial direction of the case 32 from a surface 33b of the key block 33. The wall 52, the wall 53, the wall 54, and the wall 55 each serve as part of formation of a triangular prism.

The respective normals of the wall 51, the wall 52, the wall 53, the wall 54, and the wall 55 extend in different directions and cross each other.

The wall 51 has a length d11 approximately the same as the width dk1 of the key block 33. The wall 51 has a length d12 shorter than the distance dk2 from the key block 33 to the cutter ring 41. The distance d13 from the wall 51 to the joint between the wall 52 and the wall 53 is approximately the same as the thickness dk3 of the key block 33 (refer to FIG. 11). The wall 51 protrudes outward from the wall 52 and the wall 53.

Preferably, such a plurality of members 50 as above is provided around a disc cutter 40. In the present embodiment, two members 50 are provided around a disc cutter 40.

Preferably, as in the present embodiment, one member 50 is provided on one side in the axial direction of a cutter ring 41 (direction of the fixed axis AX2) and another member 50 is provided on the other side.

In the present embodiment, such a member 50 is attached to a key block 33 by welding.

The member 50 has a plurality of faces facing in different directions. The plurality of faces of the member 50 varies mutually discontinuously.

The member 50 provided includes a humped shape protruding toward the cutter chamber 30C. In the present embodiment, the humped shape included in the member 50 protrudes from the surface 33b of the key block 33.

Method of Measuring Wear Amount of Cutter Ring of Disc Cutter

Figure 15:
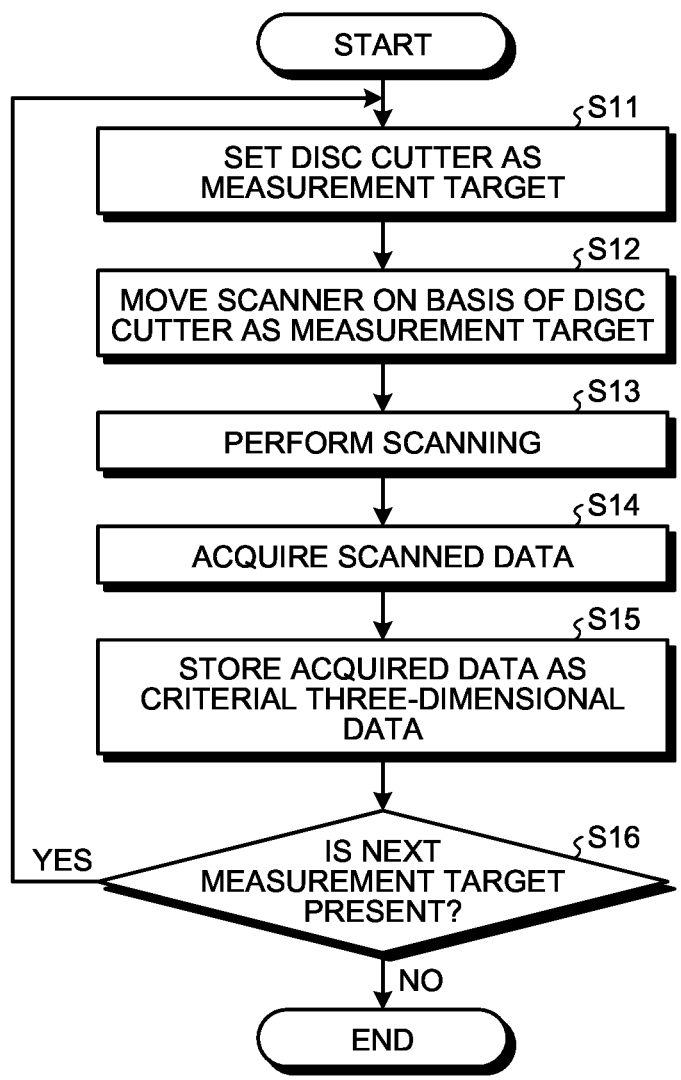
FIG. 15 is a flowchart of an exemplary processing procedure of a method of measuring the cutter ring of a disc cutter in the criterial state.
Figure 16:
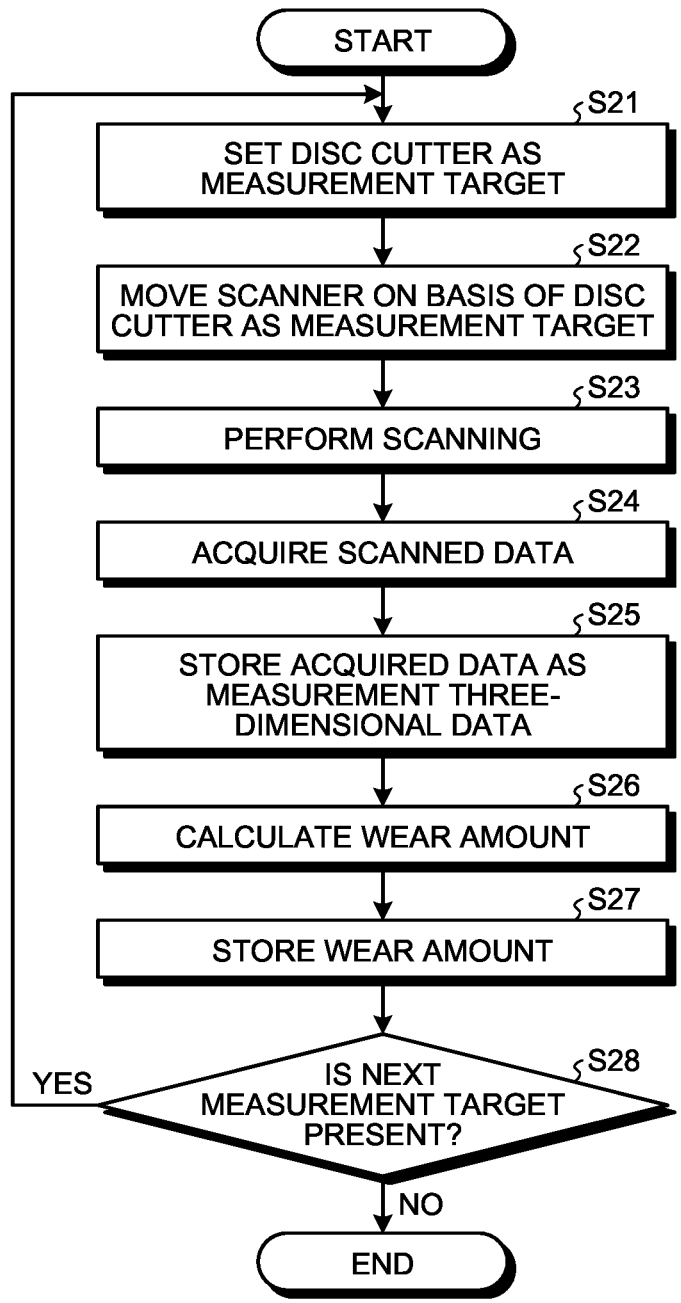
FIG. 16 is a flowchart of an exemplary processing procedure of a method of measuring the cutter ring of a disc cutter in an operation state.

Next, a method/processing of measuring the wear amount of the cutter ring 41 of a disc cutter 40 with the measurement device 60 in the tunnel boring machine 1 including disc cutters 40 will be described. FIG. 15 is a flowchart of an exemplary processing procedure of a method of measuring the cutter ring 41 of a disc cutter 40 in the criterial state. FIG. 16 is a flowchart of an exemplary processing procedure of a method of measuring the cutter ring 41 of a disc cutter 40 in an operation state. Before measurement of the wear amount of the cutter ring 41 of a disc cutter 40 in an operation state in the tunnel boring machine 1, the processing illustrated in FIG. 15 is performed at least once, resulting in acquisition of criterial three-dimensional data of the disc cutter 40. Such criterial three-dimensional data is preferably acquired in response to mounting of a new disc cutter 40 or mounting of a disc cutter 40 on which a new cutter ring is mounted.

The measurement target setting unit 111 in the measurement controller 110 sets a disc cutter 40 as the measurement target (Step S11). For example, the order of measurement of all disc cutters 40 mounted on the cutterhead 30 is stored in a storage unit not illustrated. In accordance with the stored order, the measurement target setting unit 111 sets the corresponding disc cutter 40 as the measurement target. The measurement target setting unit 111 in the measurement controller 110 controls the drive motor 29 to rotate the cutterhead 30 such that the scanner 65 can measure the disc cutter 40 as the measurement target. The measurement controller 110 proceeds to Step S12.

The measurement controller 110 moves the scanner 65 on the basis of the disc cutter 40 as the measurement target (Step S12). More particularly, the front-and-back movement control unit 112 in the measurement controller 110 controls the front-and-back movement actuator 62 to adjust the position in the front-and-back direction of the scanner 65 on the basis of the disc cutter 40 as the measurement target. The up-and-down movement control unit 113 in the measurement controller 110 controls the up-and-down movement actuator 64 to adjust the position in the up-and-down direction of the scanner 65 on the basis of the disc cutter 40 as the measurement target. The measurement controller 110 proceeds to Step S13.

The scanner control unit 114 in the measurement controller 110 controls the scanner 65 to perform three-dimensional measurement of the disc cutter 40 as the measurement target (Step S13). The scanner control unit 114 causes the scanner 65 to scan the three-dimensional shape of the disc cutter 40 as the measurement target. The scanner control unit 114 measures the three-dimensional shape of the cutter ring 41 in the criterial state together with the three-dimensional shape of the members 50. The measurement controller 110 proceeds to Step S14.

The data acquisition unit 115 in the measurement controller 110 acquires data measured by the scanner 65 in the measurement device 60 (Step S14). The measurement controller 110 proceeds to Step S15.

The data acquisition unit 115 in the measurement controller 110 stores the acquired data as the criterial three-dimensional data of the disc cutter 40 into a storage unit 120 (Step S15). The criterial three-dimensional data of the disc cutter 40 includes three-dimensional shape data of the cutter ring 41 and three-dimensional shape data of the members 50 in the criterial state. The data acquisition unit 115 stores the acquired criterial three-dimensional data in association with identification information regarding the disc cutter 40 as the measurement target. The measurement controller 110 proceeds to Step S16.

The measurement controller 110 determines whether or not a disc cutter 40 as the next measurement target is present (Step S16). In a case where a disc cutter 40 yet to be measured is present, the measurement controller 110 determines that a disc cutter 40 as the next measurement target is present (Yes in Step S16), and then performs the processing in Step S11 again. In a case where all disc cutters 40 have been measured, the measurement controller 110 determines that no disc cutter 40 as the next measurement target is present (No in Step S16), and then terminates the processing.

In this manner, with the measurement device 60, the measurement controller 110 acquires and stores the criterial three-dimensional data of the cutter ring 41 of each disc cutter 40 in the criterial state and the members 50 each provided at the part constant in relative position to the cutter ring 41.

After acquisition of the criterial three-dimensional data, the processing illustrated in FIG. 16 is performed, for example, before the start of daily work or every predetermined period, resulting in measurement of the wear amount of the cutter ring 41 of each disc cutter 40 in the tunnel boring machine 1. Step S21, Step S22, and Step S28 are similar in processing to Step S11, Step S12, and Step S16 described above, respectively, and thus the descriptions thereof will be omitted.

In Step S23, the scanner control unit 114 in the measurement controller 110 controls the scanner 65 to perform three-dimensional measurement of the disc cutter 40 as the measurement target. The scanner control unit 114 measures the three-dimensional shape of the cutter ring 41 in an operation state together with the three-dimensional shape of the members 50. The measurement controller 110 proceeds to Step S24.

The data acquisition unit 115 in the measurement controller 110 acquires data measured by the scanner 65 in the measurement device 60 (Step S24). The measurement controller 110 proceeds to Step S25.

The data acquisition unit 115 in the measurement controller 110 stores the acquired data as the measurement three-dimensional data of the disc cutter 40 into the storage unit 120 (Step S25). The measurement three-dimensional data of the disc cutter 40 includes three-dimensional shape data of the cutter ring 41 and three-dimensional shape data of the members 50 in the operation state. The measurement controller 110 proceeds to Step S26.

The wear-amount calculation unit 116 in the measurement controller 110 reads the criterial three-dimensional data of the disc cutter 40 with reference to the identification information regarding the disc cutter 40, and calculates the wear amount of the cutter ring 41 of the disc cutter 40, on the basis of the criterial three-dimensional data and the measurement three-dimensional data (Step S26). The measurement controller 110 collates the criterial three-dimensional data and the measurement three-dimensional data, to calculate the wear amount of the cutter ring 41. FIG. 17(*a*) and (b) are schematic explanatory views of alignment in measurement. As illustrated in FIG. 17(*a*), the wear-amount calculation unit 116 performs alignment between the criterial three-dimensional data indicated with broken lines and the measurement three-dimensional data indicated with solid lines, with respective members 50 as the criterion, namely, such that the respective members 50 are superimposed together. As illustrated in FIG. 17(*b*), the difference between the blade edge 44 in the criterial three-dimensional data and the blade edge 44 in the measurement three-dimensional data after alignment corresponds to the wear amount W of the cutter ring 41. The measurement controller 110 proceeds to Step S27.

The wear-amount calculation unit 116 in the measurement controller 110 stores, into the storage unit 120, the calculated wear amount of the cutter ring 41 of the disc cutter 40 in association with the identification information regarding the disc cutter 40 (Step S27). The measurement controller 110 proceeds to Step S28.

In a case where a disc cutter 40 yet to be measured is present, the measurement controller 110 determines that a disc cutter 40 as the next measurement target is present (Yes in Step S28), and then performs the processing in Step S21 again. In a case where all disc cutters 40 have been measured, the measurement controller 110 determines that no disc cutter 40 as the next measurement target is present (No in Step S28), and then terminates the processing.

Due to such processing as above, the wear amount of the cutter ring 41 of each disc cutter 40 in the tunnel boring machine 1 in an operation state is calculated.

Effects

In the present embodiment, with a member 50 provided at a part constant in relative position to the cutter ring 41 of a disc cutter 40, alignment is performed between the criterial three-dimensional data and the measurement three-dimensional data measured by the measurement device 60. Because the member 50 is located so as not to wear, the member 50 is inhibited from varying in shape between the criterial three-dimensional data and the measurement three-dimensional data. According to the present embodiment, highly accurate alignment can be performed between the criterial three-dimensional data and the measurement three-dimensional data. In this manner, the present embodiment enables highly accurate measurement of the wear amount of the cutter ring 41.

According to the present embodiment, alignment with the member 50 enables achievement of the targeted accuracy of measurement, regardless of the shape of the member 50. According to the present embodiment, alignment with the member 50 enables achievement of the targeted accuracy of measurement, regardless of the wear amount of the cutter ring 41. According to the present embodiment, alignment with the member 50 enables achievement of the targeted accuracy of measurement, regardless of the angle of measurement.

In the present embodiment, with the member 50, alignment is performed between the criterial three-dimensional data and the measurement three-dimensional data. Thus, highly accurate acquisition of the coordinates and posture of the scanner 65 in the measurement device 60 need not be obtained. According to the present embodiment, the wear amount of the cutter ring 41 can be easily measured.

In the present embodiment, the member 50 has a plurality of faces facing in different directions. According to the present embodiment, regardless of the relative position between the measurement device 60 and the member 50 with the cutter ring 41 of the disc cutter 40, geometric features of the member 50 can be detected, resulting in achievement of more accurate detection. According to the present embodiment, regardless of the relative position between the measurement device 60 and the member 50 with the cutter ring 41 of the disc cutter 40, the wear amount of the cutter ring 41 can be measured highly accurately.

In the present embodiment, the member 50 is provided closer to the cutter chamber 30C in the tunnel boring machine 1. According to the present embodiment, in excavation of the tunnel boring machine 1, the excavation can be inhibited from being interfered with the member 50, and the member 50 can be inhibited from wearing.

In the present embodiment, the member 50 together with the cutter ring 41 is located detectably in the detection area of the measurement device 60. According to the present embodiment, the criterial three-dimensional data and the measurement three-dimensional data that indicate the three-dimensional shape of the cutter ring 41 and the member 50 can be easily acquired.

In the present embodiment, the member 50 is provided at a key block 33. According to the present embodiment, the member 50 can be located so as not to interfere with replacement of the disc cutter 40.

In the present embodiment, the member 50 is attached to the key block 33 by welding. If the member 50 is damaged or deformed, the member 50 can be easily replaced together with the key block 33.

In the present embodiment, such a plurality of members 50 is provided around the disc cutter 40. According to the present embodiment, in measurement of the measurement device 60, an improvement can be made in the accuracy of alignment.

In the present embodiment, one member 50 is provided on one side in the axial direction of the cutter ring 41 and another member 50 is provided on the other side. According to the present embodiment, regardless of the relative position between the measurement device 60 and the members 50 with the cutter ring 41 of the disc cutter 40, the members 50 can be detected. Thus, the present embodiment enables highly accurate alignment between the criterial three-dimensional data and the measurement three-dimensional data. According to the present embodiment, regardless of the relative position between the measurement device 60 and the members 50 with the cutter ring 41 of the disc cutter 40, more accurate detection can be achieved.

In the present embodiment, each member 50 provided includes a humped shape protruding toward the cutter chamber 30C. According to the present embodiment, the accuracy of detection of the members 50 is inhibited from deteriorating due to the influence of clogging, for example, due to excavated muck in excavation.

In the present embodiment, the members 50 are each provided replaceably at a key block 33. According to the present embodiment, for example, in a case where any member 50 is damaged, only the member 50 can be easily replaced. According to the present embodiment, the members 50 can be easily mounted on the conventional cutterhead 30.

Modification of Position at which Additional Member is Provided

Such a member 50 as above may be fixed to a case 32, a retainer 43 (retaining member), or a hub 42 by welding, instead of to a key block 33. In this case, at the time of replacement, the member 50 needs to be detached by cutting.

[First Modification of Shape of Additional Member]

Figure 18:
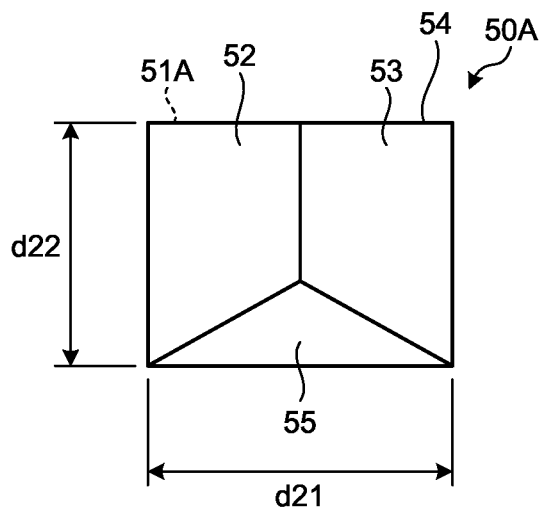
FIG. 18 is a front view of an exemplary member.
Figure 19:
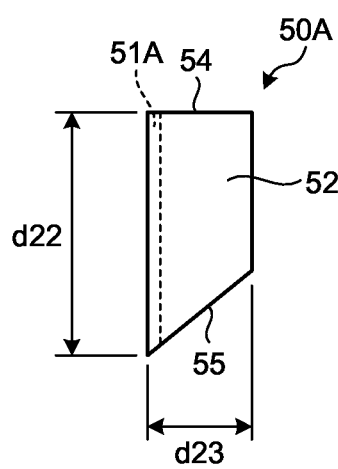
FIG. 19 is a side view of the member illustrated in FIG. 18.
Figure 20:
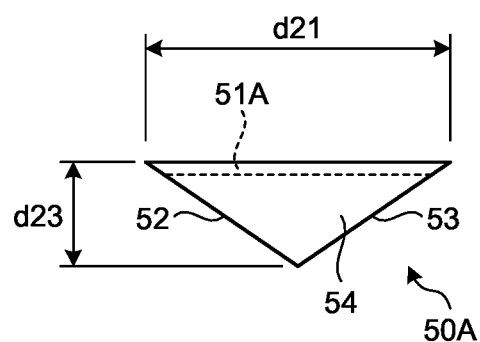
FIG. 20 is a plan view of the member illustrated in FIG. 18.

An exemplary shape of a member 50A will be described with FIGS. 18 to 20. FIG. 18 is a front view of an exemplary member 50A. FIG. 19 is a side view of the member 50A illustrated in FIG. 18. FIG. 20 is a plan view of the member 50A illustrated in FIG. 18. The member 50A has a wall 51A different in shape from the wall 51 of the member 50, and is smaller than the member 50. The wall 51A has a length d21 shorter than the length d11 of the wall 51 of the member 50. The wall 51A has a length d22 the same as the length d12 of the wall 51 of the member 50. The distance d23 from the wall 51A to the joint between a wall 52A and a wall 53A is the same as the distance d13 of the member 50. A circumferential edge 52a of the wall 52 and a circumferential edge 53a of the wall 53 are each joined to an end portion of the wall 51A. The wall 51A does not protrude outward from the wall 52 and the wall 53. Such a shape of the member 50A can be made smaller than the member 50.

Second Modification of Shape of Additional Member

Figure 21:
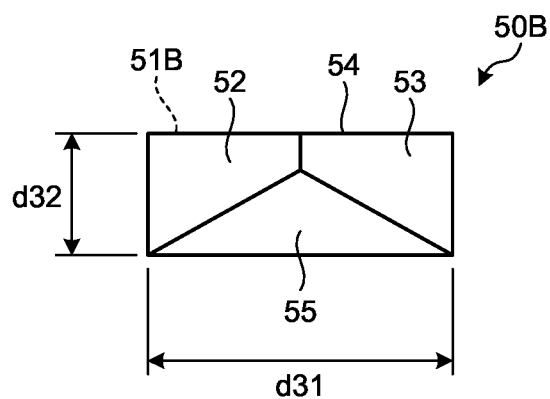
FIG. 21 is a front view of an exemplary member.
Figure 22:
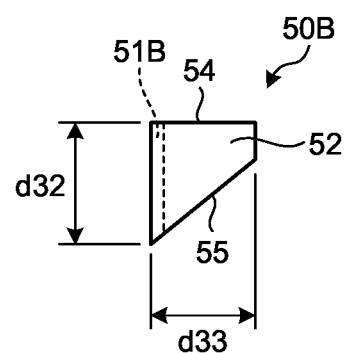
FIG. 22 is a side view of the member illustrated in FIG. 21.
Figure 23:
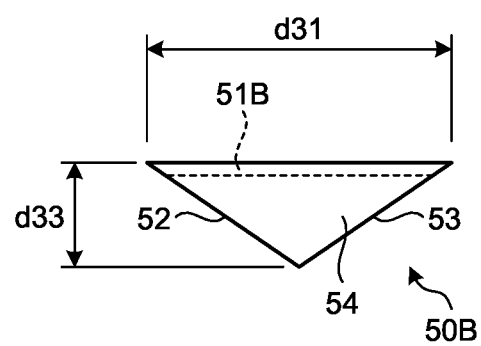
FIG. 23 is a plan view of the member illustrated in FIG. 21.

An exemplary shape of a member 50B will be described with FIGS. 21 to 23. FIG. 21 is a front view of an exemplary member 50B. FIG. 22 is a side view of the member 50B illustrated in FIG. 21. FIG. 23 is a plan view of the member 50B illustrated in FIG. 21. The member 50B is smaller than the member 50A. A wall 51B has a length d31 the same as the length d21 of the wall 51A of the member 50A. The wall 51B has a length d32 shorter than the length d22 of the wall 51A of the member 50A. The distance d33 from the wall 51B to the joint between a wall 52B and a wall 53B is the same as the distance d23 of the member 50A. Such a shape of member 50B can be made smaller than the member 50 and the member 50A.

Comparison with Conventional Technique

Figure 24:
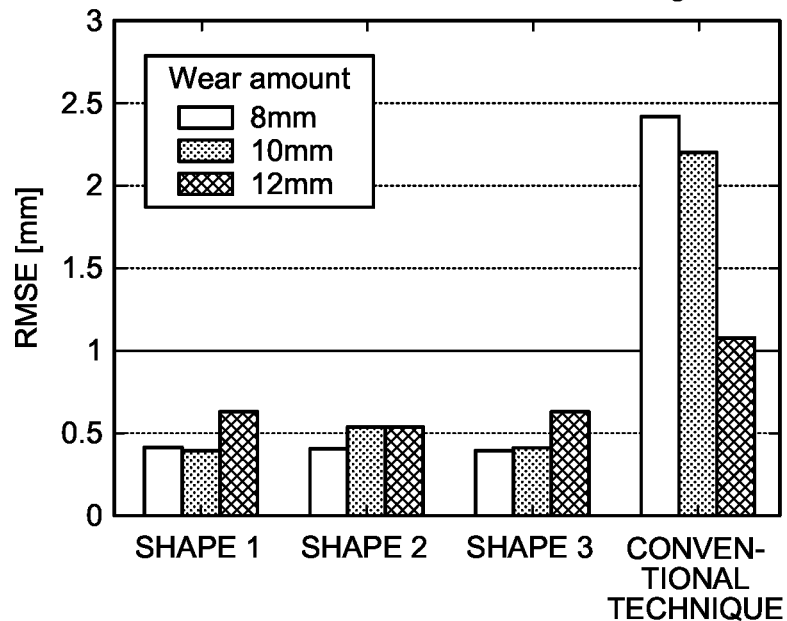
FIG. 24 is an explanatory graph of differences in the accuracy of measurement from a conventional technique.
Figure 25:
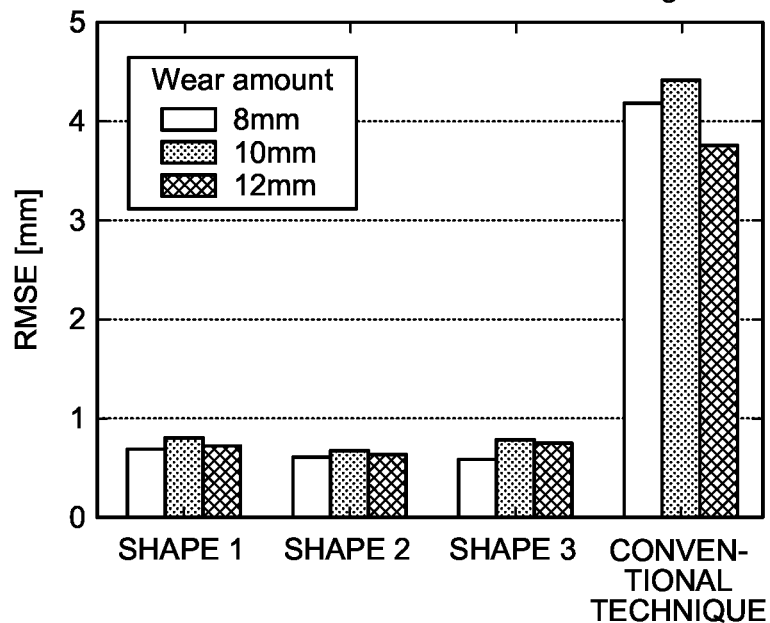
FIG. 25 is an explanatory graph of influence on the accuracy of measurement due to the angle of measurement.
Figure 26:
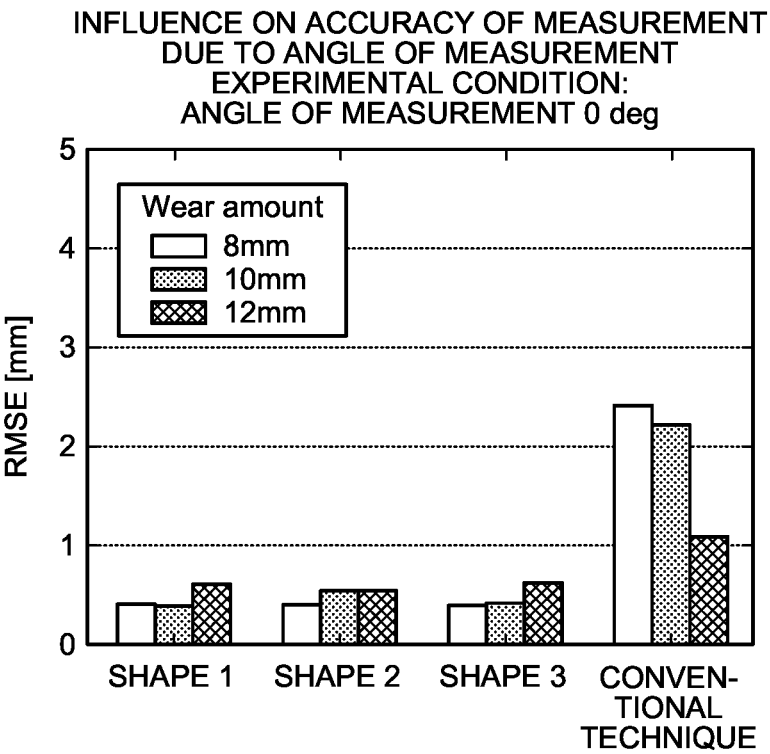
FIG. 26 is an explanatory graph of influence on the accuracy of measurement due to the angle of measurement.

Here, measurement with the measurement device 60 and measurement with a conventional technique are evaluated in the accuracy of measurement. FIG. 24 is an explanatory graph of differences in the accuracy of measurement from the conventional technique. FIG. 25 is an explanatory graph of influence on the accuracy of measurement due to the angle of measurement. FIG. 26 is an explanatory graph of influence on the accuracy of measurement due to the angle of measurement. With a combination of the following three conditions, measurement was performed ten times in each condition.

(Condition 1) Measurement is performed with a variation in the shape of a member 50 for use in alignment. More particularly, measurement with the measurement device 60 with the member 50, the member 50A, and the member 50B described above for alignment and measurement with the conventional technique are performed. "Shape 1" indicates measurement with the member 50, "Shape 2" indicates measurement with the member 50A, "Shape 3" indicates measurement with the member 50B, and "Conventional Technique" indicates measurement with the conventional technique.

Figure 27:
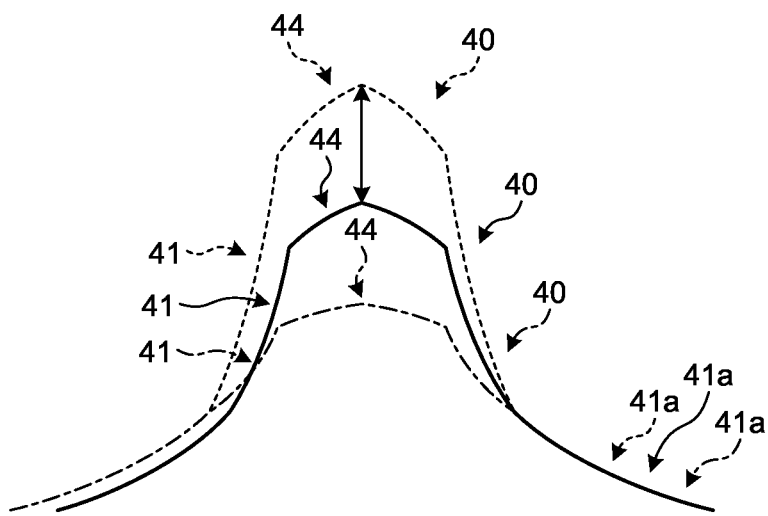
FIG. 27 is a schematic explanatory view of alignment with the conventional technique.

Here, measurement with the conventional technique will be described with FIG. 27. FIG. 27 is a schematic explanatory view of alignment with the conventional technique. The conventional technique is a technique in which, without any member for alignment, the wear amount is measured with alignment, for example, based on the shape of a shoulder 41a that the cutter ring 41 of a disc cutter 40 has. A broken line indicates three-dimensional data acquired in the criterial state, a solid line indicates three-dimensional data acquired in an operation state, and a dot-and-dash line indicates three-dimensional data acquired in an operation state with further wear. From FIG. 27, because of alignment based on the shape of the shoulder 41a of the cutter ring 41, in a case where the shoulder 41a wears due to further wearing, obviously, it is difficult to perform alignment properly.

(Condition 2) Measured is the wear amount of the cutter ring 41 of the disc cutter 40 that varies from 8 mm to 10 mm and then to 12 mm.

(Condition 3) Measurement is performed at two angles of 0° and 30° as the angle of measurement.

Evaluation is performed on the basis of comparison in the root mean square error (RMSE) between a measured value $f_k$ with the measurement device 60 and a gage measured value $y_k$ with a gauge at each of n number of measurement points, calculated with the following Mathematical Expression 1. Herein, the measurement point in front of the scanner 65 on the circumference of the disc cutter 40 is defined as 0°, and measurement is performed in the range from −40° to 40°. In the range, the wear amount is measured every 2° for approximately 40 points in total. Note that the targeted RMSE is 1 mm.

$$RMSE = \sqrt{\frac{1}{n}\sum_{k}^{n}(f_k - y)^2} \quad (1)$$

From FIG. 24, obviously, Shape 1, Shape 2, and Shape 3 are smaller in RMSE than the conventional technique. Obviously, in each of Shape 1, Shape 2, and Shape 3, the difference in RMSE due to the differences in the wear amount is small. Regardless of the wear amount of the cutter ring 41 of the disc cutter 40, Shape 1, Shape 2, and Shape 3 each fall below the targeted RMSE, resulting in achievement of the targeted accuracy of measurement.

From FIGS. 25 and 26, regardless of the angle of measurement, Shape 1, Shape 2, and Shape 3 are smaller in RMSE than the conventional technique. The conventional technique is larger in RMSE at an angle of measurement of 30° than at an angle of measurement of 0°. Shape 1, Shape 2, and Shape 3 are slightly larger in RMSE at an angle of measurement of 30° than at an angle of measurement of 0°, but fall below the targeted RMSE. Regardless of the angle of measurement, Shape 1, Shape 2, and Shape 3 fall below the targeted RMSE, resulting in achievement of the targeted accuracy of measurement.

In the above, the member 50, the member 50A, and the member 50B are each formed of a combination of the wall 51, the wall 52, the wall 53, the wall 54, and the wall 55 planar in shape, but this is not the only configuration. The member 50, the member 50A, and the member 50B may each be formed of a combination of a plurality of curved faces or may each be formed of a combination of a planar face and a curved face.

In the above, the controller 100 and the measurement controller 110 are separately provided, but the present invention is not limited to this. The controller 100 and the measurement controller 110 may be integrally provided.

In the above, the scanner 65 is movable forward and backward by the forward-and-backward variable slider 61 and the front-and-back movement actuator 62 and is movable in the up-and-down direction by the upward-and-downward variable slider 63 and the up-and-down movement actuator 64, but moving means are not limited to this. For example, the scanner 65 may be mounted on an unmanned flight vehicle, such as a drone.

REFERENCE SIGNS LIST

1 TUNNEL BORING MACHINE
10 MAIN BODY
20 BELT CONVEYOR

29 DRIVE MOTOR
30 CUTTERHEAD
32 CASE
33 KEY BLOCK
40 DISC CUTTER
41 CUTTER RING
42 HUB
43 RETAINER (RETAINING MEMBER)
44 BLADE EDGE
50 MEMBER
60 THREE-DIMENSIONAL SHAPE MEASUREMENT DEVICE (MEASUREMENT DEVICE)
61 FORWARD-AND-BACKWARD VARIABLE SLIDER
62 FRONT-AND-BACK MOVEMENT ACTUATOR
63 UPWARD-AND-DOWNWARD VARIABLE SLIDER
64 UP-AND-DOWN MOVEMENT ACTUATOR
65 SCANNER
69 CASE
100 CONTROLLER
110 MEASUREMENT CONTROLLER
111 MEASUREMENT TARGET SETTING UNIT
112 FRONT-AND-BACK MOVEMENT CONTROL UNIT
113 UP-AND-DOWN MOVEMENT CONTROL UNIT
114 SCANNER CONTROL UNIT
115 DATA ACQUISITION UNIT
116 WEAR-AMOUNT CALCULATION UNIT

The invention claimed is:

1. A disc cutter for a tunnel boring machine comprising:
a cutter ring; and
a member for use in measurement of a wear amount of the cutter ring with a measurement device, wherein
wherein the positional relationship between the cutter ring and the member does not vary between a state just after attachment or before operation of the disc cutter and the state of the disc cutter in operation, and
the measurement device comprises a forward-and-backward variable slider, a front-and-back movement actuator, an upward-and-downward variable slider, an up-and-down movement actuator, and a scanner, wherein the scanner detects criterial three-dimensional data indicating a three-dimensional shape of the cutter ring and the member.

2. The tunnel boring machine according to claim 1, wherein
the member has a plurality of faces facing in different directions.

3. The tunnel boring machine according to claim 1, wherein
the member is provided closer to a cutter chamber in the tunnel boring machine.

4. The tunnel boring machine according to claim 1, wherein
the member is provided together with the cutter ring in a detection area of the three-dimensional shape measurement device.

5. The tunnel boring machine according to claim 1, further comprising:
a case on which the disc cutter is mounted, wherein when the disc cutter is mounted on the case, the member is provided at a positioning member that restricts movement of the disc cutter.

6. The tunnel boring machine according to claim 1, further comprising:
a case on which the disc cutter is mounted, wherein the member is provided at the case.

7. The tunnel boring machine according to claim 1, wherein
the member is provided at a retaining member that sandwiches the cutter ring in an axial direction and retains the cutter ring.

8. The tunnel boring machine according to claim 1, wherein
a plurality of the members is provided around the disc cutter.

9. The tunnel boring machine according to claim 1, wherein
the member is provided on each of one side and another side in an axial direction of the cutter ring.

10. The tunnel boring machine according to claim 1, wherein
the member provided includes a humped shape protruding toward a cutter chamber.

11. The tunnel boring machine according to claim 1, wherein
the member is provided replaceably.

12. A method of measuring, a disc cutter for a tunnel boring machine comprising a cutter ring, a wear amount of the cutter ring with a measurement device, wherein the positional relationship between the cutter ring and the member does not vary between a state just after attachment or before operation of the disc cutter and the state of the disc cutter in operation, and the measurement device comprises a forward-and-backward variable slider, a front-and-back movement actuator, an upward-and-downward variable slider, an up-and-down movement actuator, and a scanner, wherein the scanner detects criterial three-dimensional data indicating a three-dimensional shape of the cutter ring and the member, the method comprising:
acquiring, from the three-dimensional shape measurement device, criterial three-dimensional data that is three-dimensional shape data of the cutter ring in a criterial state and a member provided at a part constant in relative position to the cutter ring;
acquiring, from the three-dimensional shape measurement device, measurement three-dimensional data that is three-dimensional shape data of the cutter ring and the member in an operation state; and
collating the criterial three-dimensional data and the measurement three-dimensional data and calculating the wear amount of the cutter ring.

13. A measurement system configured to measure, in a tunnel boring machine including a disc cutter including a cutter ring, a wear amount of the cutter ring with a three-dimensional shape measurement device, the measurement system comprising:
the three-dimensional shape measurement device; and
the tunnel boring machine according to claim 1.

* * * * *